3,261,657
GRAIN SIDE TREATMENT OF CRUSTED LEATHER WITH ISOCYANATE OR ISOTHIOCYANATE TERMINATED POLYOL ESTERS OF POLYURETHANES OF POLYESTERS AND POLYOXYALKYLENE POLYOLS AND LEATHER THEREFROM

Maynard B. Neher, Columbus, and Victor G. Vely, Hilliard, Ohio, assignors, by mesne assignments, to Titekote Corporation, Wilmington, Del., a corporation of Delaware
No Drawing. Filed Dec. 3, 1962, Ser. No. 241,564
The portion of the term of the patent subsequent to Dec. 4, 1979, has been disclaimed
7 Claims. (Cl. 8—94.21)

This application is a continuation-in-part of our copending application Serial No. 846,245 filed October 14, 1959, entitled, "Leather Treating Process and Composition," and now Patent No. 3,066,997, issued December 4, 1962.

This invention relates to a substituted-amine composition used to treat leather to achieve superior properties, a process for treating leather to greatly improve its surface properties, and to the leather product resulting therefrom. More particularly, this invention relates to the novel treatment of leather, which has previously been processed to the crusted state, with a substituted-amine composition that is the product of the reaction of a diisocyanate or diisothiocyanate with a polyfunctional alcohol, amine, amino alcohol, or hydroxyl-terminated polyester.

Reaction products of polyfunctional alcohols or amines and diisocyanates have been developed and used commercially as surface coatings for materials as varied as steel, wood, concrete, and leather. In many of these existing formulations and applications, polyfunctional materials such as trimethylol propane, castor oil, or hydroxyl-terminated polyesters are reacted with a diisocyanate, then mixed with a curing agent and applied to the material to provide a continuous film or coating. Such coatings do not impregnate leather but, rather, are applied over the surface of leather to form a surface coating. These polyurethane coatings of the prior art are intended to act as a physical protection of the leather surface. They are designed in such a manner that impregnation of the leather normally does not occur to any significant extent and thus they do not chemically react with, or modify, the surface of the leather. Further, if the surface of the crusted leather is deliberately impregnated with these polyurethane materials prior to their formation as a continuous film or coating, the leather becomes inflexible, exhibits surface cracking when folded, and shows a significant decrease in many physical properties.

It is an object of this invention to provide a process for treating leather that will substantially enhance the surface properties of the leather.

It is another object of this invention to provide a new leather-treating composition comprising a modified isocyanate.

It is also an object of this invention to provide a new leather-treating composition comprising a modified isothiocyanate.

It is a further object of this invention to provide a new leather product that is significantly more scuff- and abrasion-resistant, without detriment to the other physical properties comonly attributed to leather.

Still another object of this invention is to produce a treated leather that essentially remains soft and does not become inflexible.

The above objects and other objects and advantages, which will be apparent from the description which follows, are achieved by treating leather, which has been previously processed to the crusted state, with a substituted amine. The substituted amines of interest are modified diisocyanate and diisothiocyanates. While the leather must have been processed through the crusted state for this treatment to be effective, most leather that has already received a base or pigment coat is not amenable to this treatment, because the base or pigment coat prevents the modified isocyanate or isothiocyanate composition from penetrating into the leather. Any other coating that may be applied to leather during its treatment, which will not prevent the penetration of he modified isocyanae or isothiocyanate composition of this process into the leather, will not interfere with the practice of this procedure and the beneficial results obtained therefrom.

In general in the present invention, the useful substituted amine for the composition, which is used to treat the leather, is of a molecular weight in the range of 3,000 to 20,500 and is of a characteristic molecular structure having a polyvalent organic radical linked to at least three —NCY radicals as free terminal groups, Y being selected from the group consisting of oxygen and sulfur, with each of said free terminal groups linked to the polyvalent organic radical by at least one divalent linkage consisting essentially of a substituted-amine group and a divalent organic radical, the substituted-amine group selected from the group consisting of the carbamate, thiocarbamate, substituted urea, and thiourea groups, and at least one of said polyvalent organic and divalent organic radicals being derived from a polyester compound selected from the group consisting of hydroxyl-terminated polyesters and mixtures of hydroxyl-terminated polyesters and polyesteramides.

The usfeul substituted amines are of a molecular weight in the range of 3,000 to 20,500 and are defined by the formula $$R''[(-Q-R')_m-NCY]_n$$

where $m$ is an integer of at least 1; $n$ is an integer of at least 3; Q denotes a substituted-amine linkage selected from group consisting of the carbamate, thiocarbamate, substituted urea, and thiourea groups; Y is selected from the group consisting of oxygen and sulfur; at least one of said $R''$ and $R'$ is derived from a polyester compound selected from the group consisting of hydroxyl-terminated polyesters and mixtures of hydroxyl-terminated polyesters and polyesteramides; otherwise said $R''$ being derived from a compound selected from the group consisting of polyhydroxyglycerides, aliphatic polyols, polyalkylene oxide condensation products of polyhydroxyglycerides, and polyalkylene oxide condensation products of aliphatic polyols; otherwise said $R'$ being selected from (a) the group consisting of polyoxyalkylene, poylalkylene, polyalkylene carbonate, and alkylene polyamide divalent radicals, (b) a divalent organic radical derived from a polyester compound selected from the group consisting of hydroxyl-terminated polyesters and mixtures of hydroxyl-terminated polyesters and polyesteramides, and (c) a divalent organic radical R selected from the group consisting of alkylene, arylene, and alkarylene radicals.

In general, the useful substituted-amines may be prepared by any of several different procedures; although in each of two described processes, which follow, there is a common step in which the compound from which $R''$ is derived is reacted with a diisocyanate or diisothiocyanate compound. Where $R''$ is derived from said polyester compound the diisocyanate or diisothiocyanate compound may be a relatively simple structure or may be a more complex structure of a higher molecular weight containing essentially two free isocyanate or diisocyanate groups, one at each end of the molecular structure. Where $R''$ is derived otherwise, as aforestated, the diisocyanate or diisothiocyanate reacted therewith should be of the more complex structure.

In one method of forming the composition which is used to treat the leather, a diisocyanate or diisothiocyanate is reacted with a difunctional alcohol, amine, amino alcohol or hydroxyl-terminated polyester to form a monomeric condensation product. There may be as high as two isocyanate or isothiocyanate groups present for each hydroxyl and/or amine group present to prepare the monomeric intermediate condensation product. In preparing the intermediate product the reactants present are in the ratio of $(1+m)$ moles of the diisocyanate or diisothiocyanate to each $m$ mole of the difunctional reactant, where $m$ is a number of at least 1. To achieve the best results, a slight excess of diisocyanate or diisothiocyanate should be used over the calculated amount so as to compensate for water that may be present in the difunctional compound and in the reaction solvent employed. The intermediate condensation product thus formed contains essentially two free isocyanate or isothiocyanate groups, one at each end of the molecule. The intermediate reaction product should be of a molecular weight in the range of 600 to 4,500, when a diisocyanate or diisothiocyanate, or mixture thereof, is reacted with a hydroxyl-terminated polyester or a mixture of hydroxyl-terminated polyesters and polyesteramides.

The linkage formed through the reaction of an hydroxyl group with an isocyanate group is a carbamate. A carbamate group or linkage may be depicted as follows:

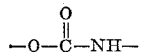

The reaction of a hydroxyl group with an isothiocyanate group yields a thiocarbamate group:

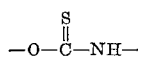

The linkage formed through the reaction of an amine group with an isocyanate group is a substituted urea which may be depicted as follows:

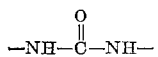

A thiourea is formed through the reaction of an amine group and an isothiocyanate group:

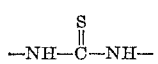

Where the difunctional compound is an alcohol, the reaction with a diisocyanate compound may be illustrated as follows:

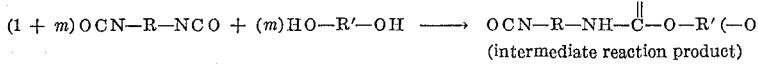
(intermediate reaction product)

where $m$ is an integer of at least 1. In the above formula, and those that follow, R denotes a divalent radical selected from the group consisting of alkylene, arylene, and alkarylene radicals; and R' denotes a divalent organic radical selected from the group consisting of polyoxyalkylene, polyalkylene, polyalkylene carbonate, and alkylene polyamide radicals, and a divalent organic radical derived from a compound selected from the group consisting of hydroxyl-terminated polyesters and polyesteramides.

The intermediate reaction product described above then may be reacted with additional quantities of a difunctional alcohol or amine in such a manner as to form a low polymer terminated with two free isocyanate or isothiocyanate groups, and then is reacted with a polyol or polyamine to form a monomeric condensation product, containing three or more free isocyanate or isothiocyanate groups, of a molecular weight in the range of 3,000 to 20,500. In this second reaction the proportions of the reactants may be varied so as to achieve products of various molecular size within the aforedefined molecular weight range. The following equation illustrates one possible reaction involving the reaction of an intermediate reaction product containing isocyanate groups with a diol to form a low linear polymer (another intermediate reaction product) terminated with two free isocyanate groups:

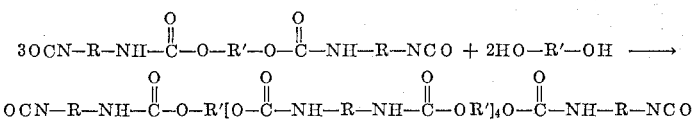

The following formula is intended to be illustrative of one of the large monomers that may be formed where polyhydroxy cross-linking compounds are employed to prepare the substituted-amine product:

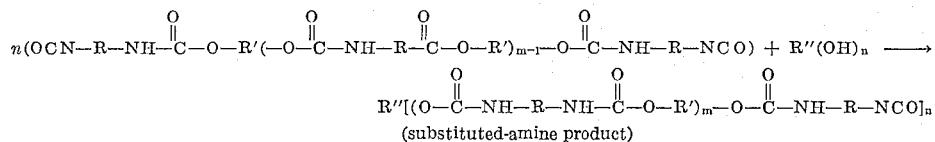
(substituted-amine product)

$n=3$ or more, the various $n$, $m$, R, R', and R'' are such as to provide a substituted-amine product of a molecular weight in the range of 3,000 to 20,500 and the $m$, R and R' being as hereinbefore described and R'' being a polyvalent organic radical derived from a polyol, such for example as derived from polyhydroxyglycerides, aliphatic polyols, polyalkylene oxide condensation products of polyhydroxyglycerides, polyalkylene oxide condensation products of aliphatic polyols, hydroxylterminated polyesters, and mixtures of hydroxylterminated polyesters and polyesteramides, each having at least three terminal hydroxyl groups per molecule thereof.

In another method of forming the substituted-amine composition which is used to treat the leather, a diisocyanate or diisothiocyanate compound or mixture thereof is reacted with the polyester compound from which R'' is derived. Such useful diisocyanate or diisothiocyanate compounds are defined by the formula YCN—R—NCY where Y are R are as aforedefined. This reaction may be illustrated as follows:

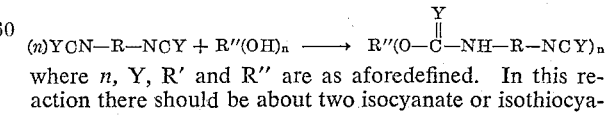

where $n$, Y, R' and R'' are as aforedefined. In this reaction there should be about two isocyanate or isothiocyanate groups present for each hydroxyl group present. To achieve the best results, a slight excess of diisocyanate or diisothiocyanate should be used over the amount calculated as the 2:1 equivalent so as to compensate for water that may be present in the hydroxyl-terminated polyester reactant and in the reaction solvent employed. The condensation product formed should be of a molecular weight in the range of 3,000 to 20,500 and contains at least three free isocyanate or isothiocyanate groups each linked through a divalent organic radical R and a divalent linkage consisting essentially of a substituted-amine group to a polyvalent organic radical derived from the polyester compound.

The reaction products obtained when a diisothiocyanate is used as a reactant in place of the diisocyanate will be identical to the formulations illustrated above, except that in all cases the oxygen of the isocyanate and carbonyl radicals will be replaced by a sulfur atom. The linkage formed through the reaction of a hydroxyl group with an isothiocyanate is a thiocarbamate. The linkage formed through the reaction of an amine group with an isothiocyanate is a substituted thiourea.

The products described above are illustrative of the modified isocyanate and isothiocyanate compositions that are of great value in treating leather. In preparing these compositions, among the organic compounds, both aromatic and aliphatic diisocyanates and diisothiocyanates may be used as reactants. The aliphatic diisocyanates, however, are more toxic and for this reason are not preferred.

Among those organic diisocyanates and diisothiocyanates that may be used, the following are illustrative of those containing an aliphatic nucleus:

Hexamethylene diisocyanate
Ethylene diisocyanate
Trimethylene diisocyanate
Decamethylene diisocyanate
Tetramethylene diisocyanate
Propylene diisocyanate
Butylene-1,2-diisocyanate
Butylene-2,3-diisocyanate
Decamethylene diisothiocyanate
Propylene diisothiocyanate
Butylene-1,3-diisothiocyanate The following are illustrative of organic diisocyanates, and diisothiocyanates, which contain an aromatic nucleus, that may be used as reactants:

2,4-tolylene diisocyanate
2,6-tolylene diisocyanate
3,3'-bitolylene 4-4'-diisocyanate
Diphenyl methane 4,4'-diisocyanate
3,3'-dimethyl diphenyl methane 4,4'-diisocyanate
m-Phenylene diisocyanate
p-Phenylene diisocyanate
o-Phenylene diisocyanate
p-Phenylene diisothiocyanate
2,4-tolylene diisothiocyanate
2,6-tolylene diisothiocyanate Inorganic diisocyanates may be used in place of the organic diisocyanates and diisothiocyanates. An example of an inorganic diisocyanate is sulfodiisocyanate.

The difunctional alcohol or amine reacted with the diisocyanate or diisothiocyanate is preferably a linear polyether that is a glycol having its hydroxyl groups separated by a repeating ether linkage such as ethylene oxide, propylene oxide, or butylene oxide. These glycols are known as polyoxyethylenes, polyoxypropylenes, and polyoxbutylenes. Examples of the polyoxyethylenes useful as reactants are the polyethylene glycols having a molecular weight ranging from about 200 to about 4,000. Examples of the polyoxypropylenes useful as reactants are the polypropylene glycols having a molecular weight ranging from about 200 to about 4,000. Examples of polyoxybutylenes useful as reactants are the polybutylene glycols having a molecular weight ranging from 200 to 4,000. Moreover, either mixtures of different molecular weights of one type of polyether or mixtures of different polyethers can be employed as reactants so as to produce a particular product.

Other suitable difunctional hydroxy-terminated compounds that can be reacted with a diisocyanate or diisothiocyanate are hydrocarbon derivatives, such as polymethylene glycols having a molecular weight ranging from about 200 to about 4,000 and adducts of diethylene glycol and chloroformates, such as monoethylene glycol bis chloroformate and diethylene glycol bis chloroformate.

Suitable amines for reaction with the diisocyanates or diisothiocyanates to form the modified compounds of interest, had to be specially prepared, since they are not available commercially. The amine used as a reactant is either a diamine or a polyamine, depending on the end product desired. Examples of diamines that were used in the preparation of the intermediate reaction product are octadecamethylene-1,18-diamine and condensation products of adipic acid and hexane diamine. They can be prepared by laboratory procedures well known in the art.

Hydroxyl-terminated polyesters suitable for reaction with the diisocyanates, or diisothiocyanates, or mixtures thereof to form the intermediate condensation product are known. Usually such hydroxyl-terminated polyesters are made by reacting a dicarboxylic acid, such as phthalic, terephthalic, adipic, succinic, pimelic, maleic acids, or like acids, with one or more polyhydroxy compounds, containing from about 2 to 12 carbon atoms, such as ethylene glycol, propylene glycol, sorbitol, and the like. In such preparations of the hydroxyl-terminated polyesters, usually the polyhydroxy compound reactant is employed in an amount somewhat in excess of the amount equivalent for esterification of all of the carboxyl groups present with water being removed from the reaction mixture to facilitate the polyester formation. When the dicarboxylic acid is reacted with a mixture of a glycol and an amino alcohol and/or diamine, the resulting product can be a mixture of hydroxyl-terminated polyesters and polyesteramides. Suitable polyester reactants generally are of a molecular weight in the range of about 600 to 4,500, and more desirably in the range of about 1,500 to 3,000. Where the polyvalent organic radical R" of the substituted-amine structure is to be derived from the polyester compound, the employed polyester compound should not only be hydroxyl terminated but should average at least three hydroxyl groups per molecule thereof. Such hydroxyl-terminated polyester compounds with an average of at least three hydroxyl groups per molecule can be prepared in a number of known ways. For example, an appropriate amount of a triol or higher polyol along with the glycol reactant used for esterification of the dicarboxylic acid reactant with and without successive additions of portions of one or more of various reactants can lead to hydroxyl-terminated polyesters of more than two hydroxyl groups per molecule. Also, where the polyester compound contains carboxyl group terminations, these terminal carboxyl groups can be reacted with organic oxides, as disclosed in U.S. Patent No. 2,863,855 to increase the polyester's hydroxyl number and thus aid in providing hydroxyl-terminated polyesters having at least three hydroxyl groups per molecule. Suitable polyester compounds not only are hydroxyl-terminated, but generally are of a molecular weight in the range of 600 to 4,500, and more desirably in the range of about 1,500 to 3,000.

The following are examples of some of the polyfunctional materials that may be employed as reactants to prepare the modified isocyanate or isothiocyanate compositions:

(1) Castor oil, castor oil modified with polyols and trihydroxy polyoxypropylenes having three linear chains and three hydroxyl groups with either glycerine, trimethylol propane, or hexane as the nucleus of the molecule; triamine prepared from diethylenetriamine, tolylene diisocyanate and hexane diamine;

(2) Tetrahydroxy compounds such as those prepared by the addition of alkylene oxides, such as propylene or ethylene oxide to diamines such as ethylene diamine;

(3) Polyhydroxy compounds, such as those prepared from sucrose, or those prepared by reacting propylene oxide with sorbitol to obtain chains of polyoxypropylene, each chain terminated with a hydroxyl group.

The proportions and amounts of the reactants determine, to a certain extent, the nature of the final product. The proportions of the reactants determine the molecular size of the product. As the functionality of the polyfunctional reactant is increased, the proportion of the intermediate reaction product should be increased and the molecular weight (chain length) of the difunctional alcohols or amines used in the formation of the intermediate reaction product should also be increased. In the absence of such control in the preparation of the modified isocyanate or isothiocyanate composition, the leather is adversely affected by the composition, as indicated by grain cracking when the leather is folded. The higher polymers generally do not exhibit the beneficial effects on the surface properties of leather treated with them that the large monomers and lower polymers disclosed herein achieve. It has also been observed that the application to leather, even in small amounts, of simple organic diisocyanates, such as tolylene diisocyanate, causes severe grain damage. To avoid this undesirable effect in preparing the modified isocyanate and isothiocyanate compositions described herein, stoichiometric amounts of diisocyanate or diisothiocyanate and polyfunctional alcohol or amine are employed in the formation of the reaction products so as to prevent damage to the leather by unreacted diisocyanate or diisothiocyanate. It is necessary to add an additional amount of diisocyanate or diisothiocyanate which is equivalent to the water in the di- and polyfunctional alcohol or amine and solvent components in order to obtain the desired yield of product. The reaction is allowed to proceed until the monomeric diisocyanate or diisothiocyanate is reacted to the extent that only trace amounts of this material are left in the final product. These trace quantities have little or no influence on the performance of the modified isocyanate or isothiocyante product as a leather-treating chemical.

It was also observed that the addition of a greater proportion of the intermediate reaction product than the stoichiometric amount required to form a triisocyanate or triisothiocyanate with a trihydroxy compound or triamine would yield an effective and stable leather-treating composition. Various proportions of the reactants to form both the intermediate and the final isocyanate or isothiocyanate composition may be used, the only restriction being that the modified isocyanate or isothiocyanate composition applied to the leather contain not more than trace amounts of unreacted simple diisocyanate or diisothiocyanate starting material.

In general, isocyanates or isothiocyanates react with any substance containing active hydrogens, whereas they react only very slowly with the active hydrogen or carbamate or thiocarbamate groups. As the size of the molecule increases, the reaction rate of the isocyanate or isothiocyanate group with the active hydrogen of the carbamate or thiocarbamate group decreases even further. To further minimize the amount of interaction between isocyanate or isothiocyanate groups and active hydrogen, and thus to increase the stability during storage of the leather-treating compositions described herein, small amounts of organic chlorides containing a hydrolyzable chlorine atom are employed. These organic chlorides contain one or more hydrolyzable chlorine atoms per molecule. These chlorides are added to the reaction mixture in which the intermediate and final carbamate or thiocarbamate products are formed. Only a relatively small amount of the organic chloride need be added to the reaction mixture to obtain the desired effect. Some of the organic chlorides that can be used effectively for this purpose are orthochlorobenzoyl chloride and 2,4-dichlorobenzoyl chloride.

While the reaction to form the modified isocyanate or isothiocyanate composition does not require the presence of a mutual solvent or a diluent, the reaction mixture is more easily handled when a solvent-diluent is present. In the absence of such a diluent-solvent, the reaction mixture becomes quite viscous. There are many solvents that may be used. A basic requirement for the solvent is that it not interact with any of the reactants and that it not contain water to any appreciable extent. Preferably, the solvent should be free from water since additional diisocyanate reactant must be added to compensate for any water in the solvent. Some acetate esters are very satisfactory solvents. Toluene and/or xylene are satisfactory diluents. The diluent-solvent also facilitates the application of the modified isocyanate or isothiocyanate compositions to leather.

The modified isocyanate and isothiocyanate compositions described above are structurally tailored to be effective leather-treating materials at very low levels of treatment, thereby making the process of treating the leather with these materials very economical. Leather, which has been processed through the crusted state, has been treated successfully with a modified isocyanate composition, applying less than one gram of solids per square foot. Such treatment has resulted in as much as 200 to 300 percent improvement in scuff resistance in the subsequently finished leather as determined by the "International Scuff Tester." On some leathers, a greater concentration of the modified isocyante composition is required to effect the same improvement in wearing qualities. In general, it is advisable to keep the level of treatment of the leather below 10 grams of solids per square foot, since, in addition to the economic reasons, even the highly modified isocyanate or isothiocyanate compounds described herein will cause some grain damage due to excessive cross linking with the leather and leather constituents, such as, some fat liquors and water vapor normally contained within the leather.

In the process of applying the modified isocyante and isothiocyanate compositions to leather, a diluent-solvent is employed to assist in obtaining the desired degree of penetration of the leather grain. The addition of a diluent-solvent has already been disclosed; it has been indicated that the reaction mixture was more readily handled when a diluent-solvent was present. The same solvent employed as a diluent is also used as the solvent to aid in the application of the compositions to the leather. A solvent mixture may also be used. As indicated above, the only restriction on the use of a solvent is that it not interact with the isocyanate or isothiocyanate groups. An acetate ester alone, or in combination with toluene and/or xylene has proven to be a satisfactory diluent-solvent. Good results have been obtained with solutions containing 20 to 50 percent solids. Other concentrations of the modified isocyanate or isothiocyanate composition in the solvent are also possible and may be employed within the limitation of the method of application to the leather.

In the process of applying these compositions to leather, they are applied to the grain side of the leather. There are many acceptable methods of application. Among those methods that have been found acceptable are spraying, brushing, swabbing, flow-coating, and roller deposition. A dipping process, wherein both sides of the leather are treated is undesirable, since it is only necessary and desirable to treat the grain side of the leather. Treating both sides of the leather unduly increases the costs of the operation.

For clarity of understanding, the process disclosed herein for treating leather to achieve substantial improvement in surface properties will be summarized at this point. Leather that has been processed at least to the crusted state can be treated with beneficial results. A substituted-amine composition, which has at least a portion thereof derived from a hydroxyl-terminated polyester compound, and which contains at least three free isocyanate or isothiocyanate groups, or a mixture of the two, and at least one substituted-amine linkage for each free isocyanate or isothiocyanate group, is applied to the grain side of the leather. The substituted-amine composition is embodied in a diluent-solvent which acts as a carrier and diluent. The treating composition is applied in a concentration normally not exceeding 10 grams of solids per square foot of leather. After the composition has been applied, the leather is heated to evaporate the carrier solvent. The leather is ready for further processing after the solvent has been evaporated. However, there is even a further improvement produced in the surface properties of the leather by continuing the heating of the leather after the solvent has been driven off. This further heating continues and accelerates the curing effect which has been initiated by the first application of heat. The leather is now ready for the application of the base or pigment coat, and this step may proceed in the various ways presently employed in the leather industry. Thus, employing this process to improve the surface properties of the leather results in no significant alteration in the techniques or systems presently employed to apply the base or pigment coat, or any of the subsequent finish coats, to the leather.

A new leather product results from the treatment of crusted leather with these compositions in the manner described herein. This new leather product is unique in appearance and in physical characteristics. For example, it exhibits a marked improvement in both leather and finish "break" and in scuff and abrasion resistance.

The following examples are intended to more specifically and clearly illustrate the practice of this invention. All examples are on the basis of parts and percents by weight.

*Example 1*

Under an atmosphere of dry nitrogen and with constant agitation a polyester from ethylene glycol and adipic acid (this hydroxyl-terminated polyester having a hydroxyl number of about 60 and a molecular weight of about 2,000) is reacted with 2,4-tolylene diisocyanate to prepare an intermediate product. Such a polyester is commercially available. The polyester, prior to the reaction, is vacuum dried and a total of about 300 parts thereof is reacted with about 54 parts of 2,4-tolylene diisocyanate for a total of 8 hours at about 90°C. with about 3 parts of dibutyltin dilaurate being added to the reactant mixture at the 7½-hour interval. The resulting intermediate product then is reacted with about 45 parts of a polyoxypropylenated glycerol of a molecular weight of about 1,000. The reaction of the intermediate product and the polyoxypropylenated glycerol is carried out in about 100 parts of ethyl toluene at about 90° C. for about 1 hour. The resulting substituted-amine product, upon analysis, has a free isocyanate content (—NCO) of 1.1 percent (theoretical, 1.6 percent) and is of an average molecular weight approximating 8,000.

There are added to the substituted-amine product about 220 parts of ethyl toluene and about 330 parts of betaethotyethyl acetate having the formula $$CH_3COOCH_2CH_2OC_2H_5$$

to provide a leather-treating diluent-solvent solution containing about 33 percent substituted-amine product.

*Example 2*

About 245 parts of a vacuum-dried polyester of ethylene glycol and adipic acid, the polyester being of a hydroxyl number between 57 and 63, is reacted with 54 parts of 2,4-tolylene diisocyanate for 2½ hours at 90° C. under an atmosphere of dry nitrogen and with constant agitation. Then 15 parts of the like vacuum-dried polyester of ethylene glycol and adipic acid are added and the reaction continued for 2 hours more at 90° C., whereupon 40 parts of the like polyester and 3 parts of dibutyltin dilaurate are added and the reaction continued at 90° C. for ½ hour longer at 90° C. to provide an intermediate product. The resulting intermediate product is reacted with about 45 parts of a polyoxypropylenated glycerol of a molecular weight of about 1,000 in about 100 parts of ethyl toluene at about 90° C. for about one hour. The resulting substituted-amine product, upon analysis, is found to have a free isocyanate content of 1.1 percent (theoretical, 1.6 percent) and is of an average molecular weight approximating 8,000.

There are added to the substituted-amine product about 220 parts of ethyl toluene and about 330 parts of betaethotyethyl acetate to provide a leather-treating diluent-solvent solution containing about 33 percent substituted-amine product.

*Example 3*

Examples 1 and 2 are repeated in substance, except that about 53 parts of hexamethylene diisocyanate are employed in place of the 54 parts of 2,4-tolylene diisocyanate to prepare the intermediate product which then is reacted with 48 parts of the polyoxypropylenated glycerol to prepare a substituted-amine product and leather-treating composition.

*Example 4*

Examples 1 and 2 are repeated in substance, except that m-phenylene diisocyanate is used in place of 2,4-tolylene diisocyanate to prepare the intermediate product which then is reacted with about 75 parts of a polyoxypropylenated glycerol of a molecular weight of about 1,500. The resulting substituted-amine products are of a free isocyanate content of 0.8 to 0.9 percent (theoretical, 1.0 percent) and an average molecular weight approximating 8,450. The resulting substituted-amine compositions are diluted with toluene in an amount to provide diluent-solvent compositions containing about 25 percent of the substituted-amine product.

*Example 5*

About one mole of adipic acid is esterfied with 0.9 mole of ethylene glycol and 0.15 mole of monoethanolamine to prepare a polyester-polyesteramide mixture of a hydroxyl number of about 50. A successive addition procedure is followed in the preparation with the monoethanolamine being reacted with the adipic acid prior to addition of the ethylene glycol to minimize or avoid free —NH₂ terminal groups in the resulting polyester product. The 560 parts of this hydroxyl-terminated polyester-polyesteramide mixture, after vacuum drying thereof, are reacted with agitation under an atmosphere of dry nitrogen with 90 parts of an isomeric mixture of 2,4- and 2,6-tolylene diisocyanate at about 90° C. for about 5 hours in the presence of a small amount of dibutyltin dilaurate. The resulting intermediate product is reacted with about 171 parts of a polyoxyethylenated glycerol of an average molecular weight of about 2,060. The substituted-amine product from reaction of the intermediate product and the polyoxyethylenated glycerol has a free isocyanate content of about 1.2 percent (theoretical, 1.3 percent) and is of an average molecular weight approximating 9,800.

A leather-treating diluent-solvent composition containing about 40 percent by weight of the substituted-amine product is prepared by mixing the substituted-amine product in xylene.

*Example 6*

After vacuum drying, about 300 parts of a polyester, obtained from reaction of sebacic acid with excess propylene glycol to a polyester of a molecular weight of about 1,500, are reacted with agitation and under an atmosphere of dry nitrogen with 73 parts of 2,4-tolylene diisocyanate to prepare an intermediate product. The intermediate product then is reacted with about 200 parts of anhydrous castor oil to prepare a substituted-amine product of an average molecular weight approximating 5,800.

By mixing this substituted-amine product with toluene, there is prepared a leather-treating diluent-solvent composition containing about 30 percent by weight substituted-amine product.

Example 7

About 300 parts of a vacuum-dried polyester, like that employed in Example 6, is reacted with 73 parts of hexamethylene diisocyanate and the resulting intermediate condensation product then is reacted with about 8.7 parts of an anhydrous polyoxyethylenated-modified castor oil of an average molecular weight of about 1,300 to prepare a substituted-amine product of an average molecular weight approximating 6,800. A number of polyoxyethylenated-modified castor oils of various molecular weights are commercially available. By mixing this substituted-amine product in a 1:1 mixture of toluene and benzene, there is prepared a leather-treating composition containing about 25 percent by weight substituted-amine product.

Example 8

About 300 parts of a polyethylene glycol ester, like that employed in Example 6, and by a procedure closely following that of Example 1, are reacted with 55 parts of an isomeric mixture of 2,4- and 2,6-tolylene diisocyanate to prepare an intermediate product of an average molecular weight of about 3,500 and of an average molecular structure composed of three of the tolylene diisocyanate molecules condensed with two of the polyester molecules. The resulting intermediate product then is reacted with about 133 parts of a polyoxypropylenated glycerol of a molecular weight of about 2,000 to provide a substituted-amine product of a free-isocyanate content of 0.9 percent (theoretical, 1.0 percent), and of an average molecular weight of about 12,500.

Ethyl toluene, as a diluent-solvent, is mixed with the substituted-amine composition in an amount to provide a leather-treating composition containing about 35 percent substituted-amine in diluent-solvent.

Example 9

About 270 parts of a vacuum-dried propylene glycol ester of succinic acid of an average molecular weight of 900, by a procedure in general accord with that of the preceding examples, are reacted with 110 parts of 2,4-tolylene diisocyanate to prepare an intermediate product. The intermediate product is reacted with 9.1 parts of sorbitol to prepare a substituted-amine product of a free isocyanate content of about 3.1 percent (theoretical, 3.3 percent) and of an average molecular weight of about 7,650.

The substituted-amine product then is admixed with a diluent solvent composed of a 2:1 molar ratio of ethyl toluene and toluene to provide a leather-treating composition containing about 35 percent substituted-amine product.

Example 10

Example 9 is repeated with the 9.1 parts of sorbitol being replaced by 45 parts of a polyoxyethylenated sorbitol of an average molecular weight of 900. The resulting substituted-amine product has a free isocyanate content of 3 percent (theoretical, 3.1 percent) and an average molecular weight of about 8,350. This substituted-amine product is then admixed with the same diluent-solvent as employed in Example 8, to prepare a leather-treating composition containing about 30 percent substituted-amine product.

Example 11

Three moles of a carboxyl-terminated polyester from a 2:1 molar ratio of adipic acid and ethylene glycol are reacted with about one mole of glycerol; and one mole of the resulting carboxyl-terminated polyester then is reacted with sufficient ethylene oxide to provide a hydroxyl-terminated polyester with an average of about three hydroxyl groups per molecule and an average molecular weight of about 2,500. About one mole of this hydroxyl-terminated polyester is reacted with about 3 moles of 2,4-tolylene diisocyanate and the resulting substituted-amine product of an average molecular weight of about 3,000 mixed with a 1:1 mixture of betaethoxyethyl acetate and toluene, to provide a leather-treating composition containing about 30 percent substituted-amine product.

Example 12

To 115 parts of 2,4-tolylene diisocyanate under an atmosphere of dry nitrogen and under constant agitation, were slowly added 225 parts of polypropylene glycol of an average molecular weight of 750. The mixture was heated 1 hour at 100° C. Then 0.57 part of orthochlorobenzoyl chloride was added followed by 157.5 parts of a trihydroxy polyoxypropylene having a hydroxyl number of 148.5 to 181.5 and an average molecular weight of 1,030. This final mixture was reacted at 100° C. for 1 hour and diluted with a 1:1 mixture of betaethoxyethyl acetate and toluene.

Example 13

To 76.5 parts of an isomeric mixture of 2,4- and 2,6-tolylene diisocyanate under an atmosphere of dry nitrogen and under constant agitation was added a mixture of polyoxypropylene containing 102.5 parts of polypropylene glycol with an average molecular weight of 1,025 and 202.5 parts of polypropylene glycol with an average molecular weight of 2,025 dissolved in 127.3 parts of anhydrous betaethoxyethyl acetate. The reaction mixture was heated to 100° C. and maintained at this temperature for 1½ hours. Orthochlorobenzoyl chloride, 0.4 part, was added; then 68.6 parts of a trihydroxy polyoxypropylene of an average molecular weight of 1,000 was added slowly to the mixture, and the reaction mixture was heated to 100° C. for 2 hours, cooled and diluted with betaethoxyethyl acetate to 35 percent solids.

Example 14

To 76 parts of 2,4-tolylene diisocyanate under an atmosphere of dry nitrogen and under constant agitation, 200 parts of polybutylene glycol of an average molecular weight of 1000 was slowly added and heated at 55° C. for 1½ hours. A mixture of ethyl acetate and betaethoxyethyl acetate was used to reduce viscosity, then 23.1 parts of a trihydroxy polyoxypropylene with an average molecular weight of 700 was added slowly and reacted at 55° C. for 1½ hours. The mixture was then diluted further with a 1:1 mixture of ethyl acetate and betaethoxyethyl acetate.

Example 15

To 76 parts of 2,4-tolylene diisocyanate under an atmosphere of dry nitrogen and under constant agitation, 200 parts of polybutylene glycol of an average molecular weight of 1000 was slowly added and the reaction mixture heated at 550° C. for 1½ hours. A mixture of ethyl acetate and betaethoxyethyl acetate was used to reduce viscosity, then anhydrous castor oil, 32.2 parts, was added slowly and reacted at 55° C. for 1½ hours. The mixture was then diluted further with a 1:1 mixture of ethyl acetate and betaethoxyethyl acetate.

Example 16

To 139.2 parts of 2,4-tolylene diisocyanate and 0.35 part of parachlorobenzoyl chloride under an atmosphere of dry nitrogen and under constant agitation, polyethylene glycol, 240 parts, of an average molecular weight of 600 was added. The mixture was reacted for 1½ hours at 60° C., then 195.1 parts of anhydrous castor oil was added and reacted for 1½ hours at 55° C. Ethyl acetate, 574.3 parts, was added during the reaction to reduce viscosity.

Example 17

To 50.4 parts of hexamethylene diisocyanate under an atmosphere of dry nitrogen and under constant agitation, polyethylene glycol, 20 parts, of an average molecular weight of 400, dissolved in 70.4 parts of n-butylacetate was added and reacted for 1 hour at 50° C. Then, 97.5 parts of an anhydrous castor oil in 97.5 parts of normal butylacetate were added and the mixture reacted for an additional 1 hour at 50° C.

Example 18

To 47.9 parts of an isomeric mixture of 2,4- and 2,6-tolylene diisocyanate under an atmosphere of dry nitrogen and under constant agitation, 253.1 parts of polypropylene glycol with an average molecular weight of 2,025 were added slowly with 99.3 parts of betaethoxyethyl acetate. The mixture was heated and reacted at 100° C. for 2 hours, then cooled. To this intermediate reaction product was added 23.9 parts of a hexahydroxy compound based on sorbitol with polyoxypropylene chains terminated with hydroxyl groups and this final mixture was reacted for 2½ hours at 100° C. Additional betaethoxyethyl acetate was then added to yield a solution of approximately 35 percent solids.

Example 19

To 191.4 parts of 2,4-tolylene diisocyanate under an atmosphere of dry nitrogen and under constant agitation, polypropylene glycol, 1000 parts, with an average molecular weight of 2,000 was added slowly. The mixture was heated at 100° C. for 2 hours and then cooled. Then 204 parts of a tetrahydroxy compound formed by the sequential addition or propylene and ethylene oxides to propylene glycol and having an average molecular weight of 1,360 were added slowly to the intermediate reaction product and reacted for 2½ hours at 100° C. A 1:1 mixture of betaethoxyethyl acetate and toluene was then added to yield a leather treating solution of 30 percent solids.

Example 20

In the preceding examples wherever a diisocyanate is used as one of the reactants, a diisothiocyanate can be substituted without effecting any appreciable change in the procedure followed in the preparation of the desired modified isothiocyanate compound.

Example 21

In place of 76.5 parts of the isomeric mixture of 2,4- and 2,6-tolylene diisocyanate used in Example 13, 84.5 parts of p-phenylene diisothiocyanate were employed. The other reactants and conditions used to form the final reaction product were identical to those given in Example 13. A modified diisothiocyanate product resulted.

Example 22

Hexamethylene diisothiocyanate, 88 parts, was used in place of the isomeric mixture of 2,4- and 2,6-tolylene diisocyanate cited in Example 13. The other reactants and conditions used to form the final reaction product were identical to those given in Example 13. A modified diisothiocyanate product resulted.

Example 23

Example 13 was repeated, except that an inorganic diisocyanate, sulfodiisocyanate, 58.1 parts, was used in place of the isomeric mixture of 2,4- and 2,6-tolylene diisocyanate. A modified diisocyanate product was obtained.

Example 24

A chrome-tanned, vegetable-mordanted, corrected-grain cowhide shoe leather is treated in the crusted state by swabbing with the leather-treating composition of Example 1. The treated leather is dried, cured, and then finished as normal leather. The finished leather shows a significant improvement in both finish and leather break and about a 100 percent improvement in finish scuff resistance as determined by the "International Scuff Tester."

Example 25

The leather-treating composition of Example 2 is applied to leather, like that employed in Example 22, and the treated finished leather showed substantially the same improvements as obtained in Example 24.

Example 26

A vegetable-tanned, full-grain, case leather is treated with the leather-treating compositions of Examples 3, 4, and 5 by rolling the same on the grain side of the leather. After finishing, the leather shows a significant improvement in break properties as well as in scuff and abrasion resistance.

Example 27

A vegetable-tanned, corrected-grain, case leather is treated with the leather-treating compositions of Examples 6, 7, 8, 9, 10, and 11 by rolling the same on the grain side of the leather. After finishing, this leather shows a significant improvement in break properties as well as in scuff and abrasion resistance in comparison to the same finished leather not so treated.

Example 28

A chrome-tanned, mill dyed, full-grain cowhide shoe-upper leather in the dry, crusted state was first covered with a light sealer coat containing 3 to 4 percent acrylic type resin, and dried. Then the modified isocyanate composition in Example 13 was applied by spray as a 35 percent solution in betaethoxyethyl acetate to deposit 3 to 4 grams solids per square foot of leather. The treated leather was dried, cured, and then finished as normal leather. The finished leather showed a significant improvement in both finish and leather break and a 100 to 200 percent improvement in finish scuff resistance as determined by the "International Scuff Tester."

Example 29

A chrome-tanned, vegetable-retanned, corrected-grain cowhide shoe-upper leather was treated in the crusted state by swabbing with a 20 percent solution of the modified isocyanate composition prepared from tolylene diisocyanate, polypropylene glycols having molecular weights of 1,025 and 2,025 and a trihydroxy polyoxypropylene. This leather after finishing shows a significant improvement over other finished leathers in break properties and in scuff and abrasion resistance.

Example 30

The modified isocyanate composition prepared in Example 13 can be applied by roller to vegetable-tanned, corrected-grain case leather. The leather is then dried. After finishing, the leather shows significant improvement in break properties, and in scuff and abrasion resistance over other leather.

Example 31

The modified isocyanate composition of Example 17 can be applied by spraying to the grain side of vegetable-tanned, corrected-grain case leather. The leather is dried. After finishing, the leather shows significant improvement in break properties and in scuff and abrasion resistance.

Example 32

When the grain side of leather is impregnated with a modified diisothiocyanate composition prepared in accordance with the procedure described above, the surface properties of the leather would be enhanced in the same manner as when the grain side of the leather is impregnated with a modified diisocyanate composition.

Example 33

The modified isocyanate composition prepared in Example 23 was applied to the grain side of leather. The leather was then dried. After finishing, the leather showed significant improvement in its break properties as well as in scuff and abrasion resistance.

It is to be understood that changes and variations may be made without departing from the spirit and scope of the invention as defined in the appended claims.

What is claimed is:

1. A process for treating crusted leather comprising, applying to the grain side of the leather and penetrating into the leather a treating composition consisting essentially of a substituted-amine product of a molecular weight in the range of 3,000 to 20,500, said product being defined by the formula

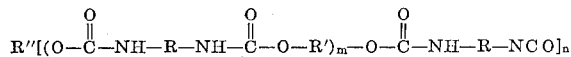

where $m$ is a positive integer greater than zero, $n$ is a positive integer greater than 2, $R''$ is a polyvalent organic radical of a compound selected from the group consisting of polyoxyalkylenated aliphatic polyol and hydroxyl-terminated polycarboxylic acid polyester each averaging at least about three terminal hydroxyl groups per molecule, $R'$ is a divalent organic radical of di-functional hydroxyl-terminated polyester, and R is a divalent radical selected from the group consisting of alkylene, arylene and alkarylene radicals, and said $m$, $n$, R, $R'$ and $R''$ are such that the substituted-amine product has said molecular weight.

2. The process of claim 1, wherein $R''$ is a polyvalent organic radical of polyoxyalkylenated aliphatic polyol averaging at least about three terminal hydroxyl groups per molecule.

3. The process of claim 1, wherein a treating composition consisting essentially of said substituted-amine product in a diluent-solvent is applied to the grain side of the leather and penetrated into the leather, and the process further includes driving off the diluent-solvent from the leather by heating.

4. The process of claim 3, wherein the diluent-solvent includes ethyl toluene and the diluent-solvent contains 20 to 50 percent of said substituted-amine product by weight.

5. The process of claim 1, wherein said substituted-amine product is defined by the formula

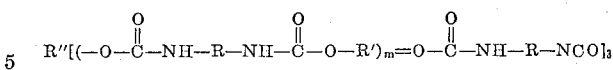

where $m$ is a positive integer of at least one, R is the tolylene radical, $R'$ is a divalent radical of di-functional hydroxyl-terminated polyester, $R''$ is a polyoxyalkylenated glyceryl radical, and $m$, $R'$ and $R''$ are such as to provide the substituted-amine product having said molecular weight.

6. The process of claim 1, wherein a treating composition consisting essentially of a diluent-solvent containing said substituted-amine product in amount of 20 to 50 percent by weight is applied to the grain side of the leather and penetrated into the leather, and the process further includes driving off the diluent-solvent from the leather by heating.

7. The product resulting from the process of claim 1.

References Cited by the Examiner

UNITED STATES PATENTS

| | | | |
|---|---|---|---|
| 2,284,896 | 6/1942 | Hanford | 260—77.5 |
| 2,292,443 | 8/1942 | Hanford | 260—77.5 |
| 2,577,279 | 12/1951 | Simon | 260—2.5 |
| 2,577,280 | 12/1951 | Simon | 260—2.5 |
| 2,948,691 | 8/1960 | Windemuth. | |
| 2,983,566 | 5/1961 | Kremen | 8—94.21 |
| 2,998,294 | 8/1961 | Locke | 8—94.21 |
| 3,066,997 | 12/1962 | Neher et al. | 8—94.21 |
| 3,178,310 | 4/1965 | Berger et al. | 117—155 X |

FOREIGN PATENTS

| | | |
|---|---|---|
| 566,206 | 9/1957 | Belgium. |
| 815,185 | 6/1959 | Great Britain. |

OTHER REFERENCES

Chem. Abst., vol. 48, 1954, 11,834b and c.

Heiss et al., Ind. & Eng. Chem., vol. 46, July 1954, pp. 1954, pp. 1498–1503.

NORMAN G. TORCHIN, *Primary Examiner.*

ABRAHAM H. WINKELSTEIN, *Examiner.*

D. LEVY, *Assistant Examiner.*